United States Patent
Wellbrock et al.

(10) Patent No.: US 9,608,757 B2
(45) Date of Patent: Mar. 28, 2017

(54) BI-DIRECTIONAL OPTICAL TRANSMISSION SYSTEM WITH COHERENT DETECTION

(71) Applicant: Verizon Patent and Licensing Inc., Arlington, VA (US)

(72) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 169 days.

(21) Appl. No.: 14/690,651

(22) Filed: Apr. 20, 2015

(65) Prior Publication Data

US 2016/0308640 A1 Oct. 20, 2016

(51) Int. Cl.
*H04J 14/00* (2006.01)
*H04J 14/02* (2006.01)
*H04Q 11/00* (2006.01)
*H04B 10/00* (2013.01)

(52) U.S. Cl.
CPC ...... *H04J 14/0212* (2013.01); *H04Q 11/0005* (2013.01); *H04Q 2011/0035* (2013.01)

(58) Field of Classification Search
CPC ............... H04J 14/0201; H04J 14/0202; H04J 14/0212; H04J 14/0216
See application file for complete search history.

(56) References Cited

U.S. PATENT DOCUMENTS

| | | | | |
|---|---|---|---|---|
| 2004/0071397 A1* | 4/2004 | Kim | ..................... | H04J 14/0209 385/24 |
| 2004/0228630 A1* | 11/2004 | Kim | ..................... | H04J 14/0212 398/83 |
| 2005/0141894 A1* | 6/2005 | Kim | ..................... | H04J 14/0208 398/83 |
| 2007/0003283 A1* | 1/2007 | Feuer | ................. | H04B 10/2503 398/83 |
| 2014/0226987 A1* | 8/2014 | Eiselt | ................. | H04J 14/0213 398/85 |

\* cited by examiner

*Primary Examiner* — Daniel Dobson

(57) ABSTRACT

An optical device includes a first optical port connected to a first optical fiber, and a second optical port connected to a second optical fiber. The optical device further includes first optical components that switch first optical traffic carried via a first set of optical channels from the first optical port to the second optical port, and second optical components that switch second optical traffic carried via a second set of optical channels from the second optical port to the first optical port. The second set of optical channels includes different optical channels than the first set of optical channels. The optical device also includes a receiver that coherently detects portions of the first optical traffic and the second optical traffic, and converts the detected portions of the first and second optical traffic to electrical signals for delivery to a node or network external to the optical device.

20 Claims, 12 Drawing Sheets

BI-DIRECTIONAL OPTICAL TRANSMISSION SYSTEM WITH COHERENT DETECTION

BACKGROUND

Optical networks employing 10 gigabit Ethernet (10 GE) transport Ethernet frames at a rate of 10 gigabits per second. A router in such an optical network typically includes multiple client interfaces, each of which uses a single optical carrier (e.g., light of a single wavelength) for receiving and/or transmitting data. Transport equipment connects to the router via multiple client interfaces, which each use the single optical carrier, to receive data transmitted from the client interfaces of the router. The transport equipment may further include multiple transport cards, each of which transmits outgoing data over a single optical carrier. The transport equipment sends the data via the single optical carriers to destination transport nodes in the optical network.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

A bi-directional optical transmission system, described herein, employs multiple optical channels that are used to transmit data in opposite directions over a same strand of optical fiber. The optical nodes of the bi-directional optical transmission system use multiple wavelength selective switches, such as, for example, "gridless" wavelength selective switches, in conjunction with optical circulators for switching and directing optical traffic heading in two different directions through the optical nodes. Each of the optical nodes further includes a transponder having coherent receivers that coherently detect optical signals to provide better filtering of the received optical signals so as to distinguish between the optical signals and back reflection noise.

Figure 1:
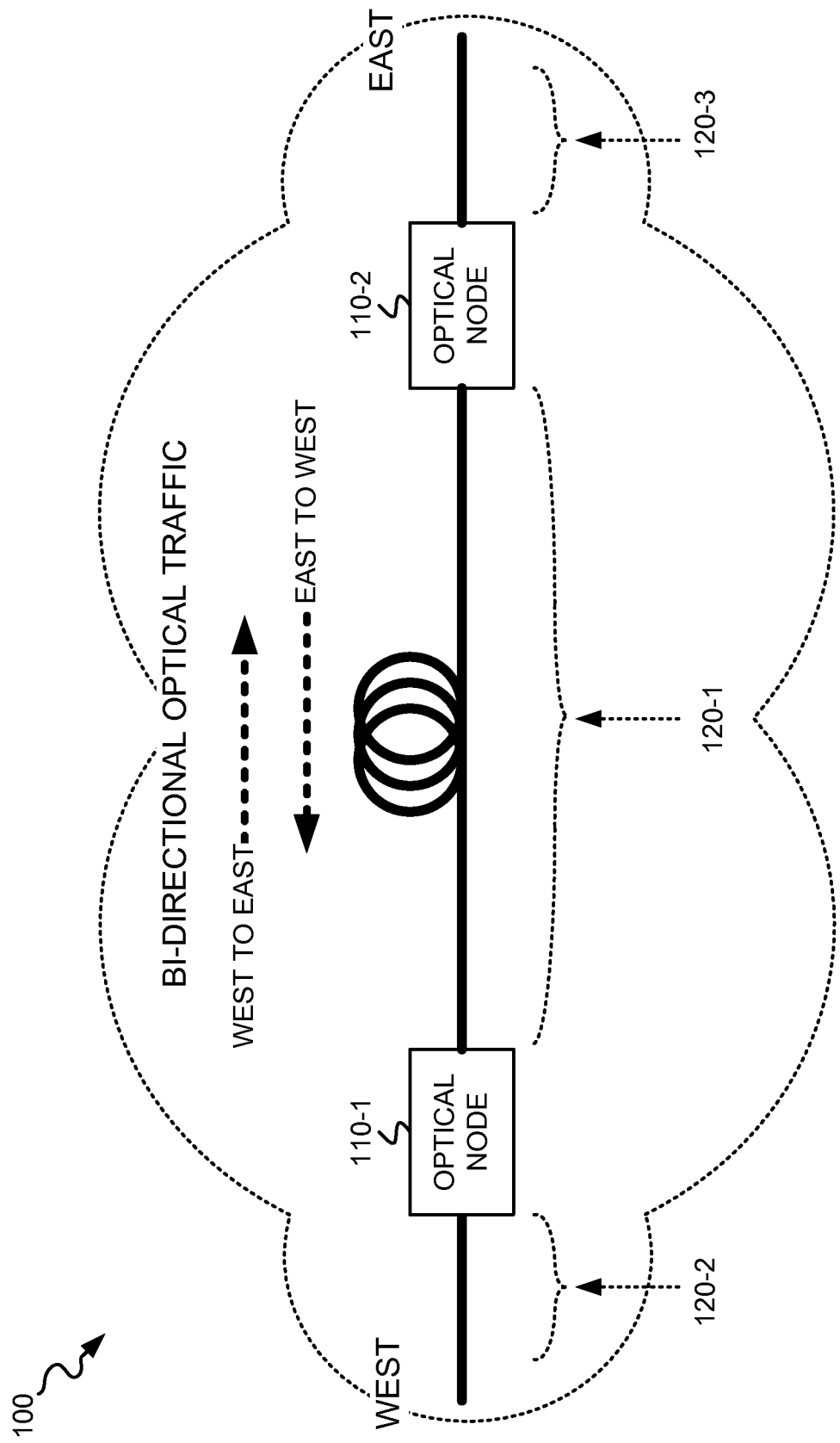
FIG. 1 is a diagram that depicts an exemplary optical network that deploys optical nodes for carrying, amplifying and adding/dropping bi-directional, multi-wavelength optical traffic transiting in two directions across the optical network.

FIG. 1 is a diagram that depicts an exemplary optical network 100 that deploys optical nodes for carrying, amplifying, switching, and adding/dropping bi-directional, multi-wavelength optical traffic transiting in two directions across optical network 100. Optical network 100 includes optical nodes 110-1 and 110-2 (hereinafter generically and individually referred to as "optical node 110") interconnected by a span of optical fiber 120-1. As further shown in FIG. 1, optical node 110-1 may connect to another optical node (not shown) via a span of optical fiber 120-2, and optical node 110-2 may connect to another optical node (not shown) via a span of optical fiber 120-3. Optical nodes 110-1 and 110-2 may include, as described in further detail below, optical devices having components for amplifying optical traffic transiting optical network 100 through optical nodes 110-1 and 110-2, and for adding new optical traffic for transit via optical network 100 and for dropping optical traffic off of optical network 100 (i.e., switching optical traffic to a destination accessible via optical node 110-1 or optical node 110-2). The left side of optical network 100 depicted in FIG. 1 is arbitrarily designated as "west" and the right side of optical network 100 is arbitrarily designated as "east." Therefore, optical traffic being carried by optical network 100 in a direction from optical node 110-2 to optical node 110-1 is designated as "east to west" traffic of the bi-directional optical traffic. Additionally, optical traffic being carried by optical network 100 in a direction from optical node 110-1 to optical node 110-2 is designated as "west to east" traffic of the bi-directional optical traffic. The bi-directional optical traffic may include optical signals carried via multiple different optical channels, with each optical channel including light of a different wavelength (λ). As described further below, the "west-to-east" traffic of the bi-directional optical traffic comprises a first set of optical channels, and the "east-to-west" traffic of the bi-directional optical traffic comprises a second set of optical channels that includes different optical channels than the first set of optical channels.

Optical nodes 110-1 and 110-2 may each further connect to additional nodes, networks or systems not shown in FIG. 1. For example, optical nodes 110-1 and 110-2 may each connect, via a transponder (not shown), to a local area network (LAN) or a wide area network (WAN), and may switch incoming optical signals, and convert the optical signals to electrical signals (e.g., packet data) for transmission over the LAN or WAN. The configuration of components of optical network 100 illustrated in FIG. 1 is for illustrative purposes. Other configurations may be implemented. Therefore, optical network 100 may include additional, fewer and/or different components that may be configured in a different arrangement from that depicted in FIG.

1. For example, though two optical nodes 110-1 and 110-2 with an interconnecting span 120-1 of optical fiber is depicted in FIG. 1, optical network 100 may include additional optical nodes 110 interconnected directly, or via intervening optical fibers, to optical nodes 110-1 and/or 110-2. Optical network 100 may also include additional optical nodes 110 not connected with optical nodes 110-1 or 110-2 either directly or indirectly.

Figure 2A:
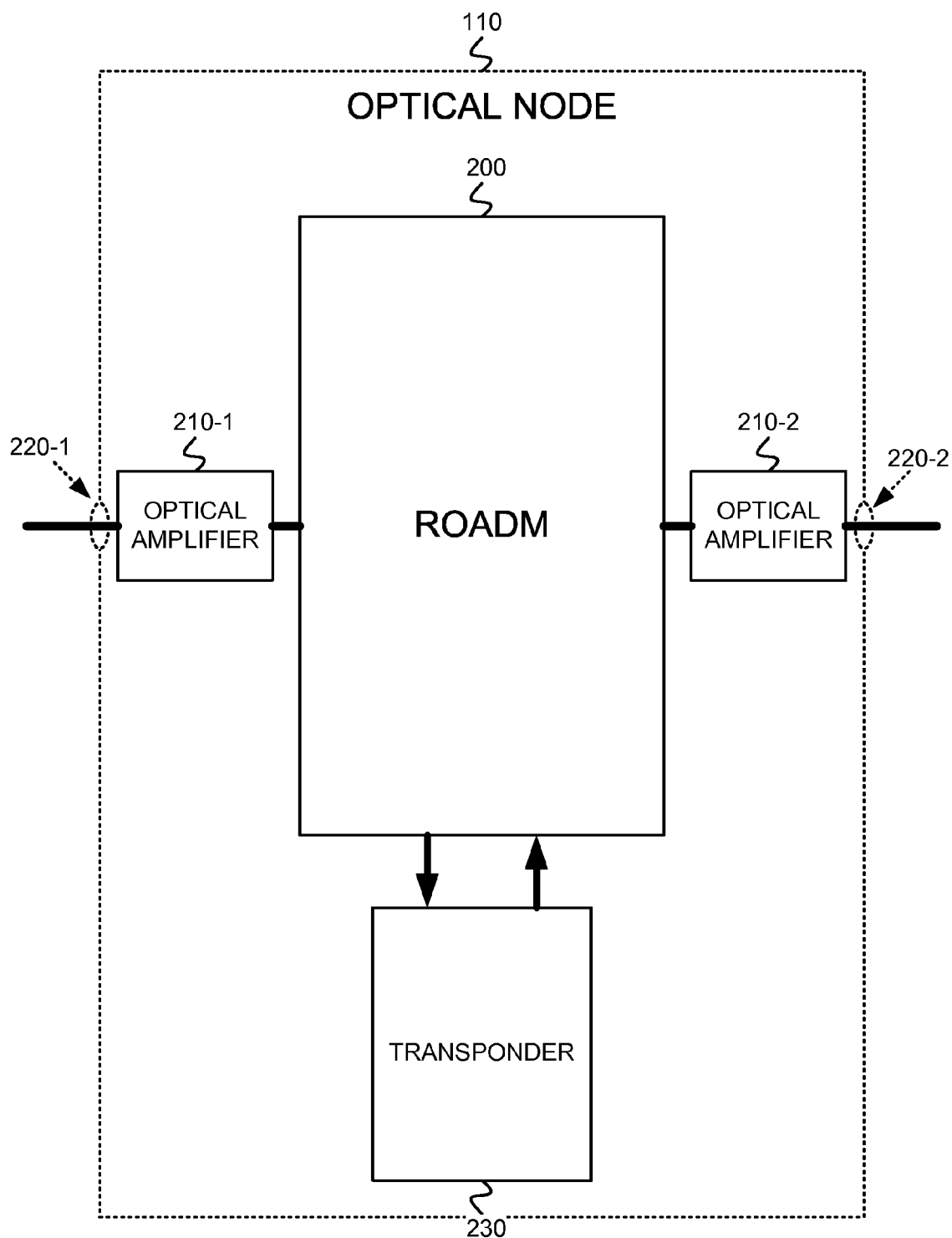
FIGS. 2A and 2B depict exemplary components of an optical node of FIG. 1.

FIG. 2A depicts exemplary components of optical node 110. As shown, optical node 110 may include a Reconfigurable Optical Add/Drop Multiplexer (ROADM) 200 interconnected between two optical amplifiers 210-1 and 210-2 that further connect to optical node ports 220-1 and 220-2, respectively. In the case of optical node 110-1, optical node port 220-1 connects to optical fiber span 120-2, and optical node port 220-2 connects to optical fiber span 120-1. In the case of optical node 110-2, optical node port 220-1 connects to optical fiber span 120-1 and optical node port 220-2 connects to optical fiber span 120-3. As further shown in FIG. 2A, ROADM 200 connects to a transponder 230. Optical amplifiers 210-1 and 210-2 amplify multi-wavelength optical signals transmitted from optical node 110. ROADM 200 includes a wavelength division multiplexing system that switches optical traffic transiting optical node 110 from optical node port 220-1 to optical node port 220-2, and transiting optical node 110 from optical node port 220-2 to optical node port 220-1. ROADM 200 further includes "add" multiplexing functionality for receiving and adding optical signals, via transponder 230, to outgoing optical signals transmitted via optical node port 220-1 or optical node port 220-2. ROADM 200 also includes "drop" multiplexing functionality for receiving and "dropping" optical signals, via transponder 230, to another node or system connected to optical node 110.

As described further with respect to FIG. 4 below, ROADM 200 multiplexes and demultiplexes data traffic carried via multiple optical channels (e.g., multiple optical wavelengths) with a first set of optical channels carrying optical traffic in an east-to-west direction, and a second set of optical channels carrying optical traffic in a west-to-east direction, and with the channels of the first set of optical channels being offset by a certain channel spacing from the channels of the second set of optical channels.

Figure 2B:
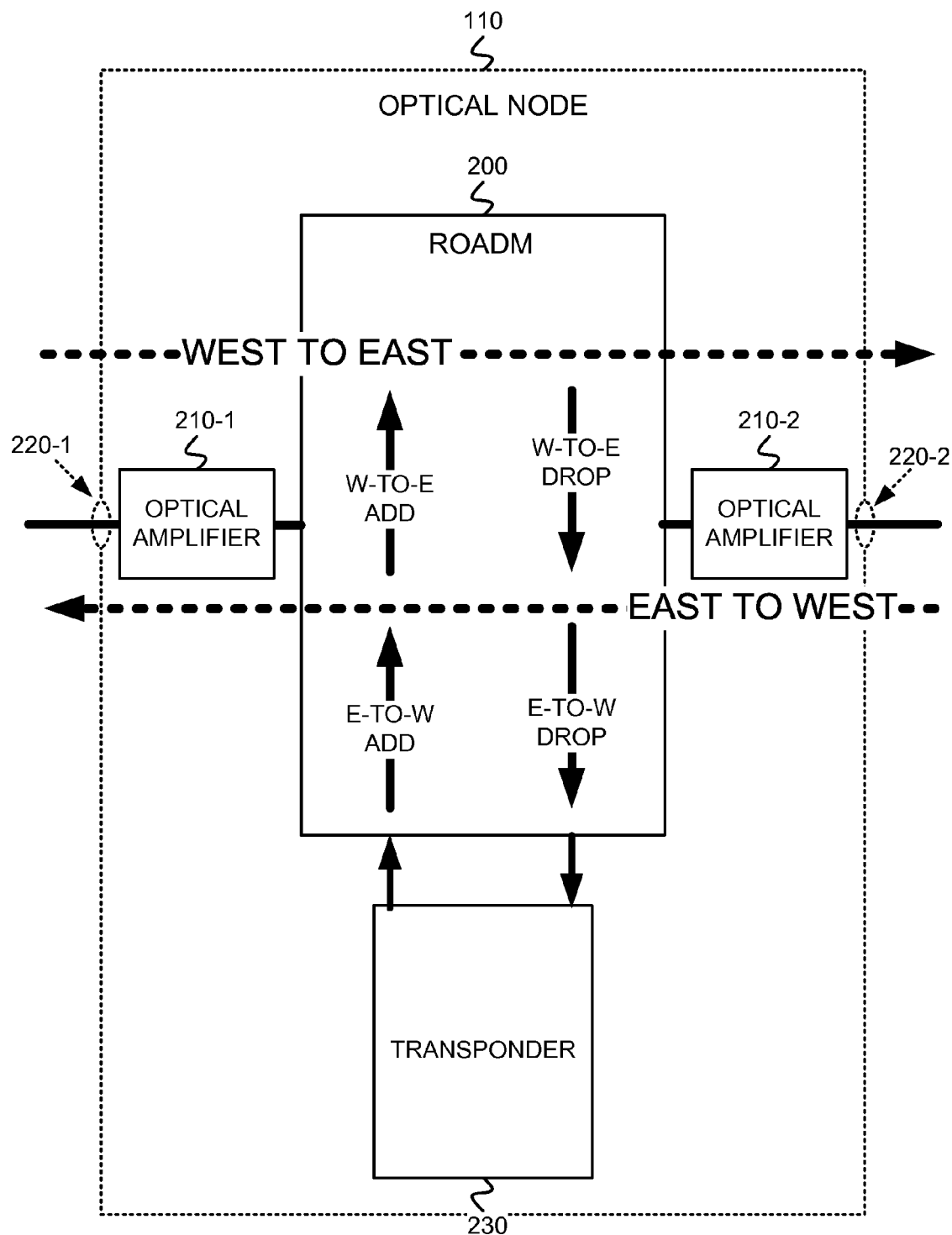

Referring to FIG. 2B, ROADM 200 includes components for switching east-to-west optical traffic received at optical node port 220-2 through to optical node port 220-1, for switching a portion of the east-to-west traffic to be "dropped" (shown as "E-to-W drop") to transponder 230, and for switching new traffic "added" via transponder 230 into the east-to-west traffic (shown as "E-to-W add"). ROADM 200 further includes components for switching west-to-east traffic received at optical node port 220-1 through to optical node port 220-2, for switching a portion of the west-to-east traffic to be "dropped" (shown as "W-to-E drop") to transponder 230, and for switching new traffic "added" via transponder 230 into the west-to-east traffic (shown as "W-to-E add").

Transponder 230 includes components for receiving outgoing electrical signals (e.g., encapsulated packet data), converting the outgoing electrical signals to outgoing optical signals, and supplying the outgoing optical signals to ROADM 200 for switching in an appropriate west-to-east or east-to-west direction for delivery to a destination optical node 110 in optical network 100. Transponder 230 further includes components for receiving incoming optical signals from ROADM 200, converting the incoming optical signals to corresponding electrical signals (e.g., encapsulated packet data), and supplying the converted electrical signals to one or more nodes or networks connected to transponder 230 (not shown in FIG. 2B). The one or more networks may include one or more of a Public Switched Telephone Network (PSTN), a wireless network, a local area network (LAN), a wide area network (WAN), a metropolitan area network (MAN), an intranet, or the Internet. The wireless network may include a satellite network, a Public Land Mobile Network (PLMN), or a wireless LAN or WAN (e.g., Wi-Fi).

Figure 3:
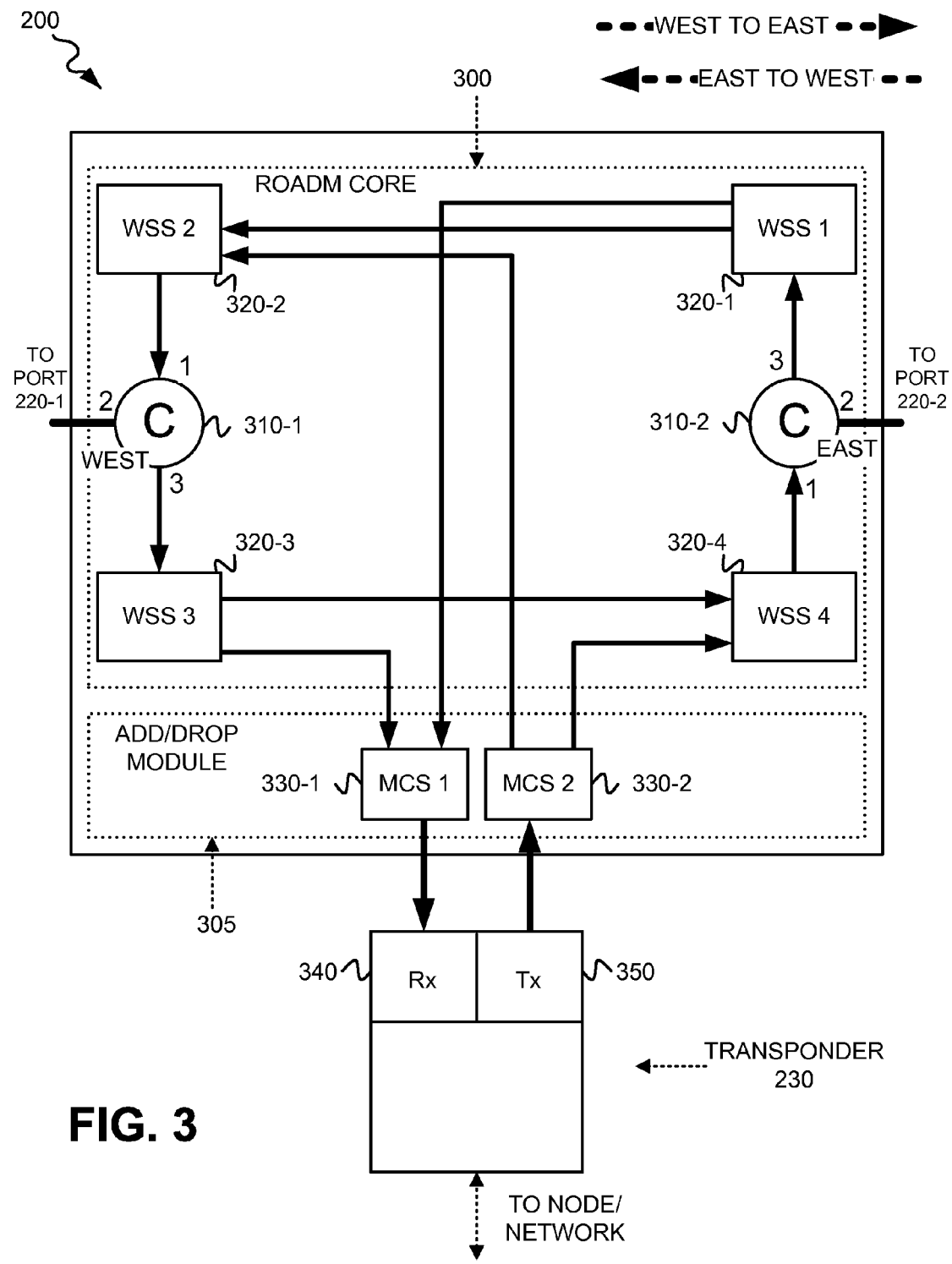
FIG. 3 depicts exemplary components of a Reconfigurable Optical Add/Drop Multiplexer within an optical node of FIG. 1.

FIG. 3 depicts exemplary components of ROADM 200 within optical node 100, and the interaction between ROADM 200 and transponder 230. As shown, ROADM 200 includes a ROADM core 300, and an add/drop module 305. ROADM core 300 includes optical circulators 310-1 and 310-2, and wavelength selective switches (WSSs) 320-1, 320-2, 320-3 and 320-4. Add/drop module 305 includes multicast switches (MCSs) 330-1 and 330-2.

MCS 330-1 and MCS 330-2 may each include any type of multicast switch operable with WSSs 320-1 through 320-4 for switching "dropped" optical signals to transponder 230, and for switching "added" optical signals from transponder 230 towards an appropriate optical port 220 of optical node 110 that corresponds to the destination of the optical signals. WSSs 320-1 through 320-4 may, in one implementation, each include a "gridless" WSS. A "gridless" WSS may perform switching between WSS ports without having to lock the spectrum of the switching to any predetermined channel plan. A "gridless" WSS, therefore, enables flexibility in channel allocation in optical network 100. Gridless WSSs 320 may include, for example, a liquid crystal on silicon (LCOS) switching element or a micro-electromechanical system (MEMs) switching element employed in a variable phase spatial light modulator (SLM). Other types of gridless WSSs 320 that enable the implementation of a flexible grid may be used in ROADM 200. The use of "gridless" WSSs further avoids self-lasing within optical nodes 110.

Optical circulators 310-1 and 310-2 each may include a 3-port optical circulator that can be used to separate optical signals that travel in opposite directions over an optical fiber, where light entering any optical port exits from the next optical port. For example, light from optical signals received at optical node port 220-2 enters port 2 of circulator 310-2 and exits port 3 for receipt at WSS 320-1, and light from optical signals received from WSS 320-4 enters port 1 and exits port 2 towards optical node port 220-2. As another example, light from optical signals received at optical node port 220-1 enters port 2 of circulator 310-1 and exits port 3 for receipt at WSS 320-3, and light from optical signals received from WSS 320-2 enters port 1 and exits port 2 towards optical node port 220-1.

Port 2 of circulator 310-2 connects to optical node port 220-2 via optical amplifier 210-2 (not shown), port 3 of circulator 310-2 connects to WSS 320-1, and port 1 of circulator 310-2 connects to WSS 320-4. Optical signals transiting in an east-to-west direction across optical network 100, from optical node port 220-2 into port 2 of circulator 310-2 of optical node 110, will exit port 3 of circulator 310-2 for input into WSS 320-1. WSS 320-1 switches optical signals of the input optical signals, destined for a node or network connected to optical node 110, via MCS 330-1 of add/drop module 305 to transponder 230. WSS 320-1 additionally switches optical signals of the input optical signals destined for another node in optical network 100 to an input of WSS 320-2. WSS 320-2 receives input optical signals from WSS 320-1, and input optical signals from MCS 330-2 of add/drop module 305 "added" by transponder 230 (described below), and switches those optical signals to port 1 of circulator 310-1. Optical signals switched by WSS 320-2 to port 1 of circulator 310-1 exit port 2 of circulator 310-1 for transit in the east-to-west direction via optical node port 220-1 of optical node 110.

Port 2 of circulator 310-1 connects to optical node port 220-1 via optical amplifier 210-1 (not shown), port 3 of circulator 310-1 connects to WSS 320-3, and port 1 of circulator 310-1 connects to WSS 320-2. Optical signals transiting in a west-to-east direction across optical network 100, from optical node port 220-1 into port 2 of circulator 310-1 of optical node 110, will exit port 3 of circulator 310-1 for input into WSS 320-3. WSS 320-3 switches optical signals of the input optical signals, destined for a node or network connected to optical node 110, via MCS 330-1 of add/drop module 305 to transponder 230. WSS 320-1 additionally switches optical signals of the input optical signals destined for another node in optical network 100 to an input of WSS 320-4. WSS 320-4 receives input optical signals from WSS 320-3, and input optical signals from MCS 330-2 of add/drop module 305 "added" by transponder 230 (described below), and switches those optical signals to port 1 of circulator 310-2. Optical signals switched by WSS 320-4 to port 1 of circulator 310-2 exit port 2 of circulator 310-2 for transit in the west-to-east direction via optical node port 220-2 of optical node 110.

MCS 330-1 receives optical signals, that are destined for another node or network (not shown) connected to transponder 230, for "dropping" by add/drop module 305 to a receiver (Rx) 340 of transponder 230. MCS 330-1 receives optical signals from WSS 320-1 received at optical node 110 via optical node port 220-2, and receives optical signals from WSS 320-3 further received at optical node 110 via optical node port 220-1. MCS 330-1 switches the received optical signals to Rx 340 of transponder 230. Rx 340 of transponder 230 detects the optical signals, converts the optical signals to corresponding electrical signals (e.g., packet data), and forwards the electrical signals towards the destination node or network connected to transponder 230. Rx 340 of transponder 230 may include a coherent detection system, including use of a local oscillator (LO), which removes back reflection noise due to phase detection. Rx 340 of transponder 230 may further include components for forward error correction and digital signal processing.

MCS 330-2 receives optical signals from transmitter (Tx) 350 of transponder 230, that are destined for delivery to another node in optical network either in an east-to-west direction out optical node port 220-1 of optical node 110 or in a west-to-east direction out optical node port 220-2 of optical node 110 for "adding" via add/drop module 305.

Tx 350 receives electrical signals from another node or network (not shown) connected to transponder 230, converts the electrical signals to corresponding output optical signals, and transmits the optical signals to MCS 330-2 for switching in an east-to-west or west-to-east direction out of optical node 110 that corresponds to the destination of the optical signals.

MCS 330-2 switches the received optical signals from Tx 350 of transponder 230, intended for a destination reachable via optical node port 220-1 of optical node 110, to WSS 320-2. WSS 320-2, in turn, switches the received optical signals from MCS 330-2 to port 1 of circulator 310-1 for exit from port 2 of circulator 310-1. MCS 330-2 further switches the received optical signals from Tx 350 of transponder 230, intended for a destination reachable via optical node port 220-2 of optical node 110, to WSS 320-4. WSS 320-4, in turn, switches the received optical signals from MCS 330-2 to port 1 of circulator 310-2 for exit from port 2 of circulator 310-2.

Figure 4A:
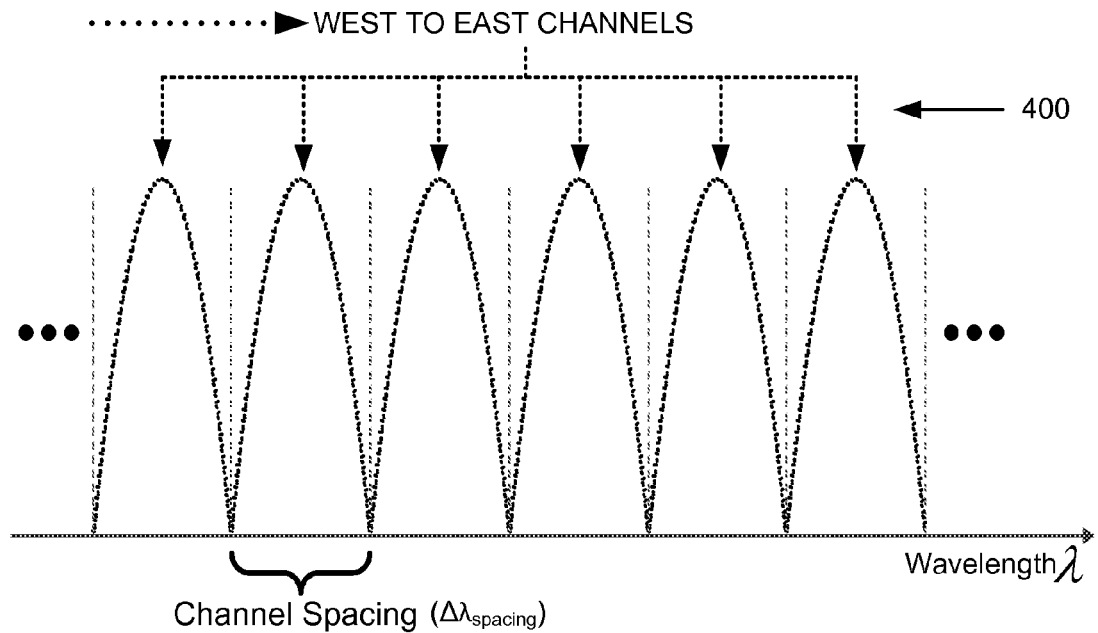
FIGS. 4A-4C depict directional channel spectrum allocation for bi-directional optical traffic carried in both an east-to-west and a west-to-east direction via the optical network of FIG. 1.
Figure 4B:
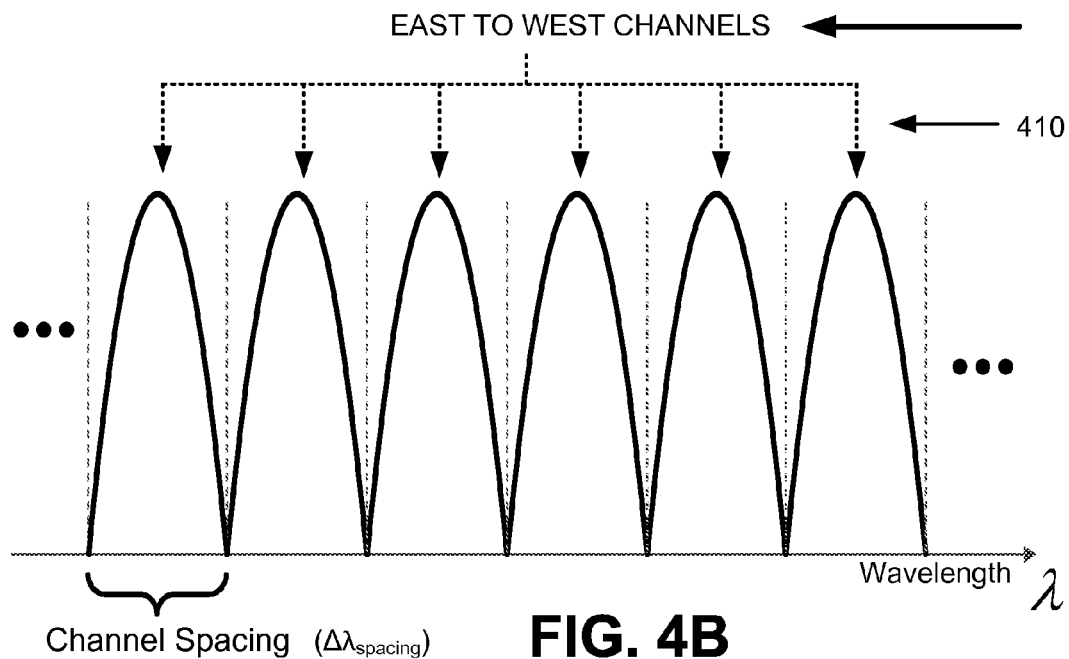
Figure 4C:
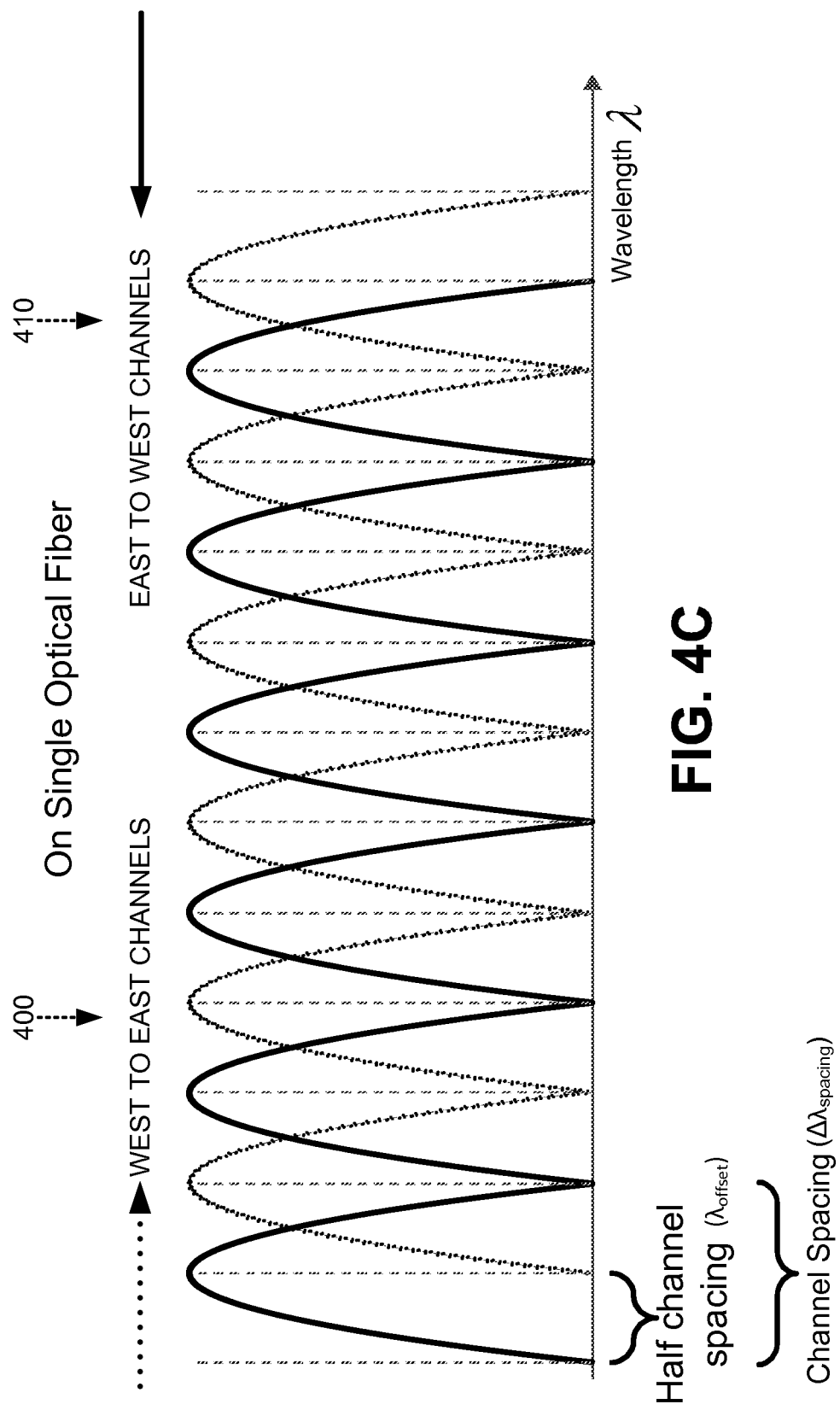

FIGS. 4A-4C depict directional channel spectrum allocation for optical traffic carried in an east-to-west and a west-to-east direction via optical network 100. As shown in FIGS. 4A-4C, west-to-east channels 400 (shown via dashed lines) may be offset from east-to-west channels 410 (shown via solid lines) such that directional cross-talk is minimized. In the channel spectrum allocation shown in FIG. 4A, the channels for the west-to-east direction 400 are assigned and spaced with a channel spacing ($\Delta\lambda_{spacing}$). In the channel spectrum allocation shown in FIG. 4B, the channels for the east-to-west direction 410 are also assigned and spaced with the channel spacing ($\Delta\lambda_{spacing}$). The optical wavelengths of each channel of west-to-east channels 400 may be evenly spaced relative to one another, and the optical wavelengths of each channel of east-to-west channels 410 may also be evenly spaced relative to one another but at an offset relative to the channels of west-to-east channels 400. FIG. 4C depicts the channel spectrum allocation of channels in both the west-to-east direction 400 and the east-to-west direction 410, on a single wavelength plot, with a channel spacing offset ($\lambda_{offset}$) instituted between the channels in the two opposition directions, where the channels in both directions are carried by a single optical fiber. In the example of FIG. 4C, the west-to-east channels 400 are offset ($\lambda_{offset}$) by one half of a channel spacing with east-to-west channels 410. For example, if the channel spacing between each of the channels of west-to-east channels 400 is a wavelength interval of $\Delta\lambda_{spacing}$, then the channels of the east-to-west channels 410 may be offset from the west-to-east channels 400 by a wavelength offset of ½ of $\Delta\lambda_{spacing}$ ($\lambda_{offset}=\frac{1}{2}*\Delta\lambda_{spacing}$). The directional channel spectrum allocation for optical traffic which enables bi-directional optical traffic in optical network 100 via a single optical fiber, as depicted in FIG. 4C, effectively doubles the fiber capacity of the optical fibers carrying optical traffic within optical network 100.

Figure 5:
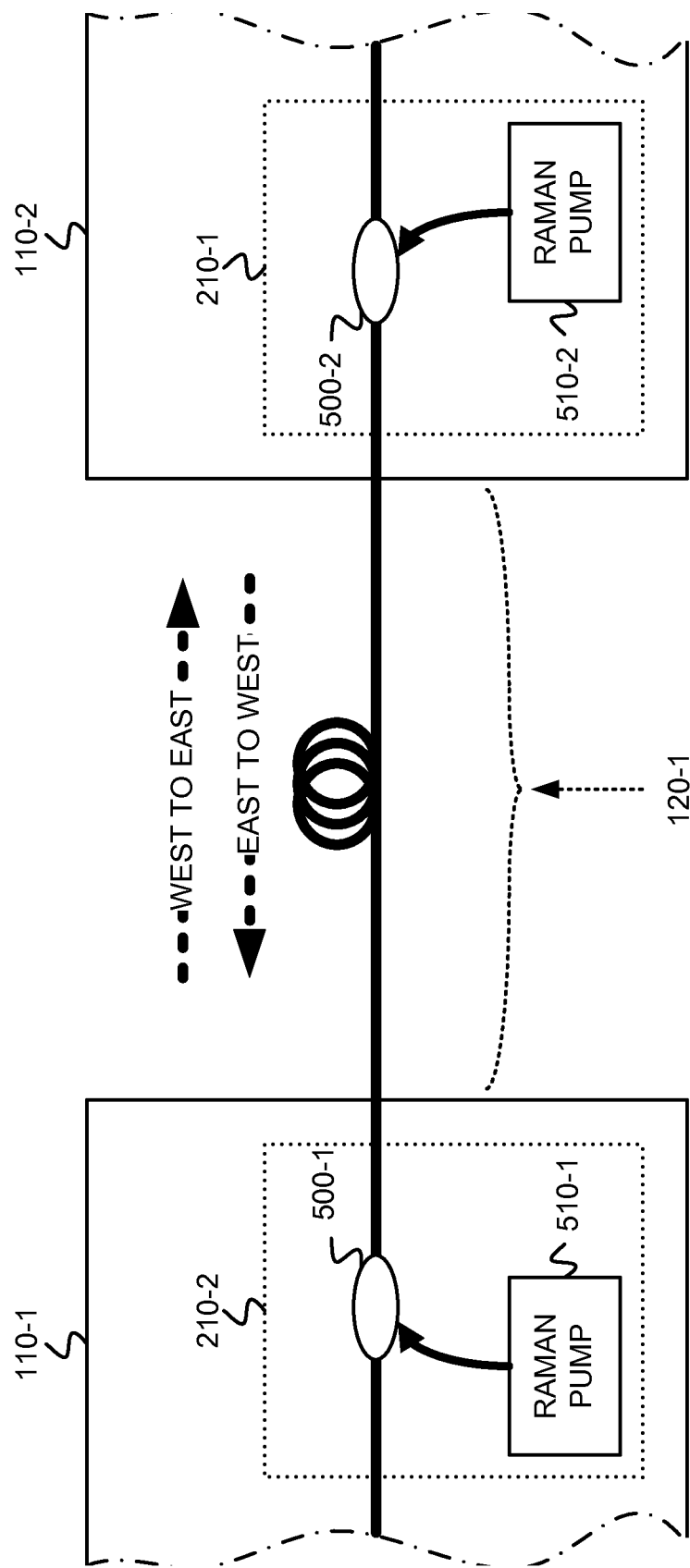
FIG. 5 depicts one exemplary implementation of optical amplification within the optical nodes of FIG. 1 where each optical amplifier of an optical node includes a Raman amplifier.

FIG. 5 depicts one exemplary implementation of optical amplification within optical nodes 110 of optical network 100 where each optical amplifier 210 of optical node 110 includes a Raman amplifier. As shown in FIG. 5, optical amplifier 210-2 of optical node 110-1 includes an optical coupler 500-1 and a Raman pump 510-1. Optical coupler 500-1 couples the light from Raman pump 510-1 to optical fiber span 120-1 such that non-linear interaction between the optical signals, transiting out of optical node 110-1 in a west-to-east direction over optical network 100, and the pump light causes amplification of the optical signals. As further shown in FIG. 5, optical amplifier 210-1 of optical node 110-2 includes an optical coupler 500-2 and a Raman pump 510-2. Optical coupler 500-2 couples the light from Raman pump 510-2 to optical fiber span 120-1 such that non-linear interaction between the optical signals, transiting out of optical node 110-2 in an east-to-west direction over optical network 100, and the pump light causes amplification of the optical signals.

Figure 6:
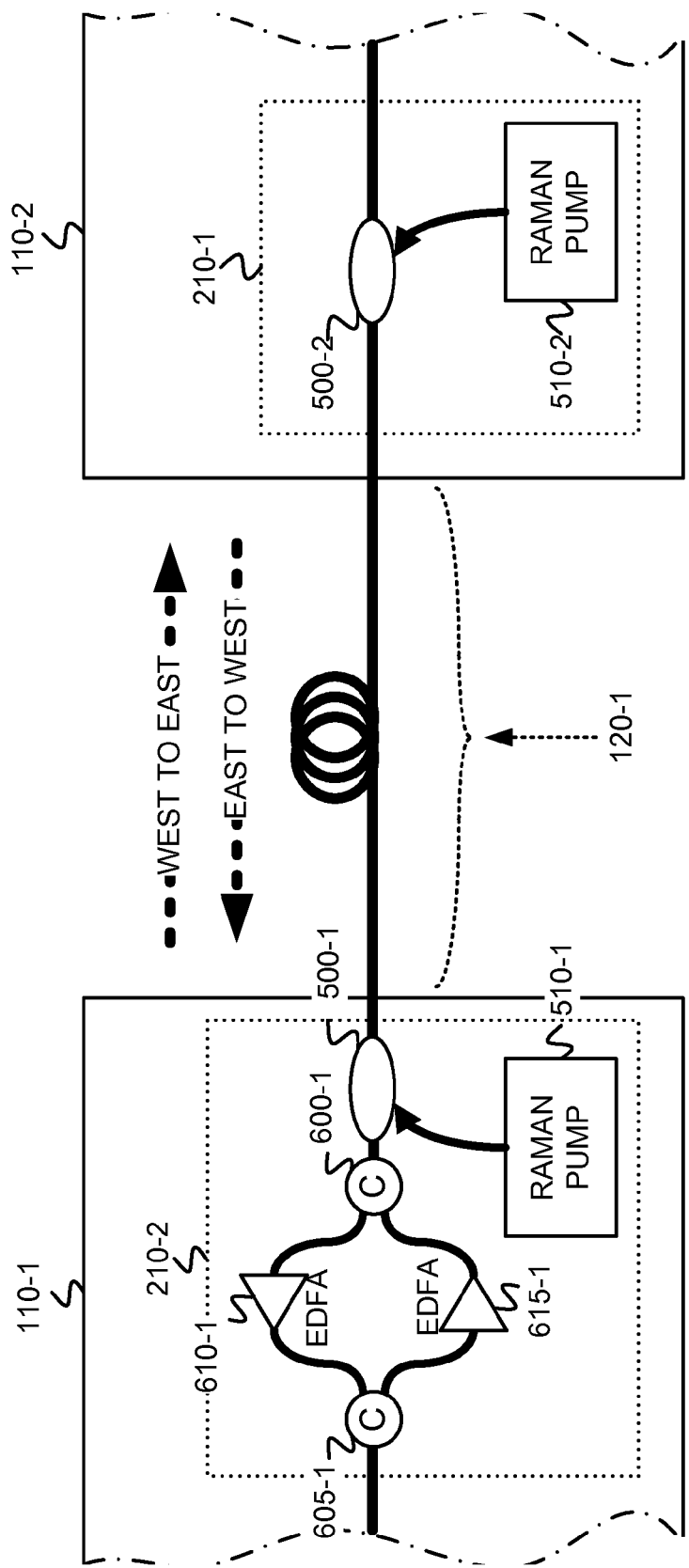
FIG. 6 depicts one exemplary implementation of optical amplification within the optical nodes of FIG. 1 where an optical amplifier of one of the optical nodes includes a Raman amplifier and an Erbium Doped Fiber Amplifier connected in series for optical amplification.

FIG. 6 depicts one exemplary implementation of optical amplification within optical nodes 110 of optical network 100 where optical amplifier 210-2 of optical node 110-1 includes a Raman amplifier and an Erbium Doped Fiber Amplifier (EDFA) connected in series for optical amplification. In the exemplary implementation shown in FIG. 6, optical amplifier 210-1 of optical node 110-2 includes a Raman amplifier as described above with respect to FIG. 5. The EDFA of optical amplifier 210-2 includes optical circulators 600-1 and 605-1 and EDFAs 610-1 and 615-1. Optical signals transiting out of optical node 110-1 in a west-to-east direction are directed by circulator 605-1 to EDFA 615-1 for amplification of the optical signals. The amplified optical signals from EDFA 615-1 are directed by circulator 600-1 to coupler 500-1 for further amplification by Raman pump 510-1. Optical signals transiting optical fiber span 120-1 into optical node 110-1 in an east-to-west direction are directed by optical circulator 600-1 to EDFA 610-1 for amplification of the optical signals. The amplified optical signals from EDFA 610-1 are output to circulator 605-1 which directs the signals towards ROADM 200 (not shown in FIG. 6). Though optical amplifier 210-1 of optical node 110-2 is shown in FIG. 6 as including only a Raman amplifier, optical amplifier 210-1 may, alternatively, include the EDFA and Raman amplifier of optical amplifier 210-2 of optical node 110-1.

Figure 7:
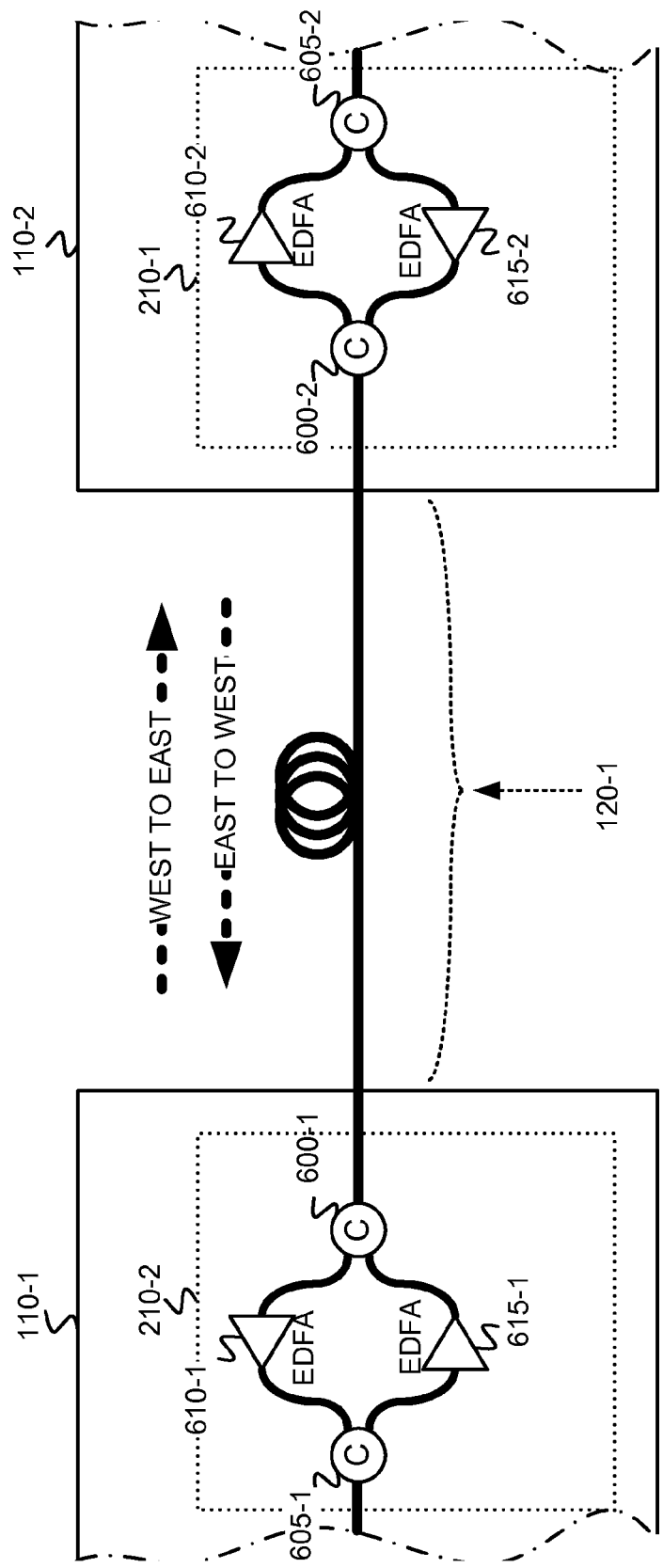
FIG. 7 depicts another exemplary implementation of optical amplification within the optical nodes of FIG. 1 where the optical amplifiers of each optical node include only an Erbium Doped Fiber Amplifier.

FIG. 7 depicts another exemplary implementation of optical amplification within optical nodes 110 of optical network 100 where optical amplifier 210-2 of optical node 110-1 and optical amplifier 210-1 of optical node 110-2 each include only an EDFA. The EDFA of optical amplifier 210-2 includes optical circulators 600-1 and 605-1 and EDFAs 610-1 and 615-1. Optical signals transiting out of optical node 110-1 in a west-to-east direction are directed by circulator 605-1 to EDFA 615-1 for amplification of the optical signals. The amplified optical signals output from EDFA 615-1 are directed by circulator 600-1 for transmission over optical fiber span 120-1. Optical signals transiting optical fiber span 120-1 into optical node 110-1 in an east-to-west direction are directed by optical circulator 600-1 to EDFA 610-1 for amplification of the optical signals. The amplified optical signals from EDFA 610-1 are output to circulator 605-1 which directs the signals towards ROADM 200 (not shown in FIG. 6).

Optical signals transiting optical network 100 in a west-to-east direction and received over optical fiber span 120-1 at optical node 110-2 are directed via circulator 600-2 to EDFA 610-2 for optical amplification. The amplified optical signals output from EDFA 610-2 are directed by circulator 605-2 to ROADM 200 (not shown) of optical node 110-2 for switching the optical signals towards their destinations in optical network 100.

Figure 8:
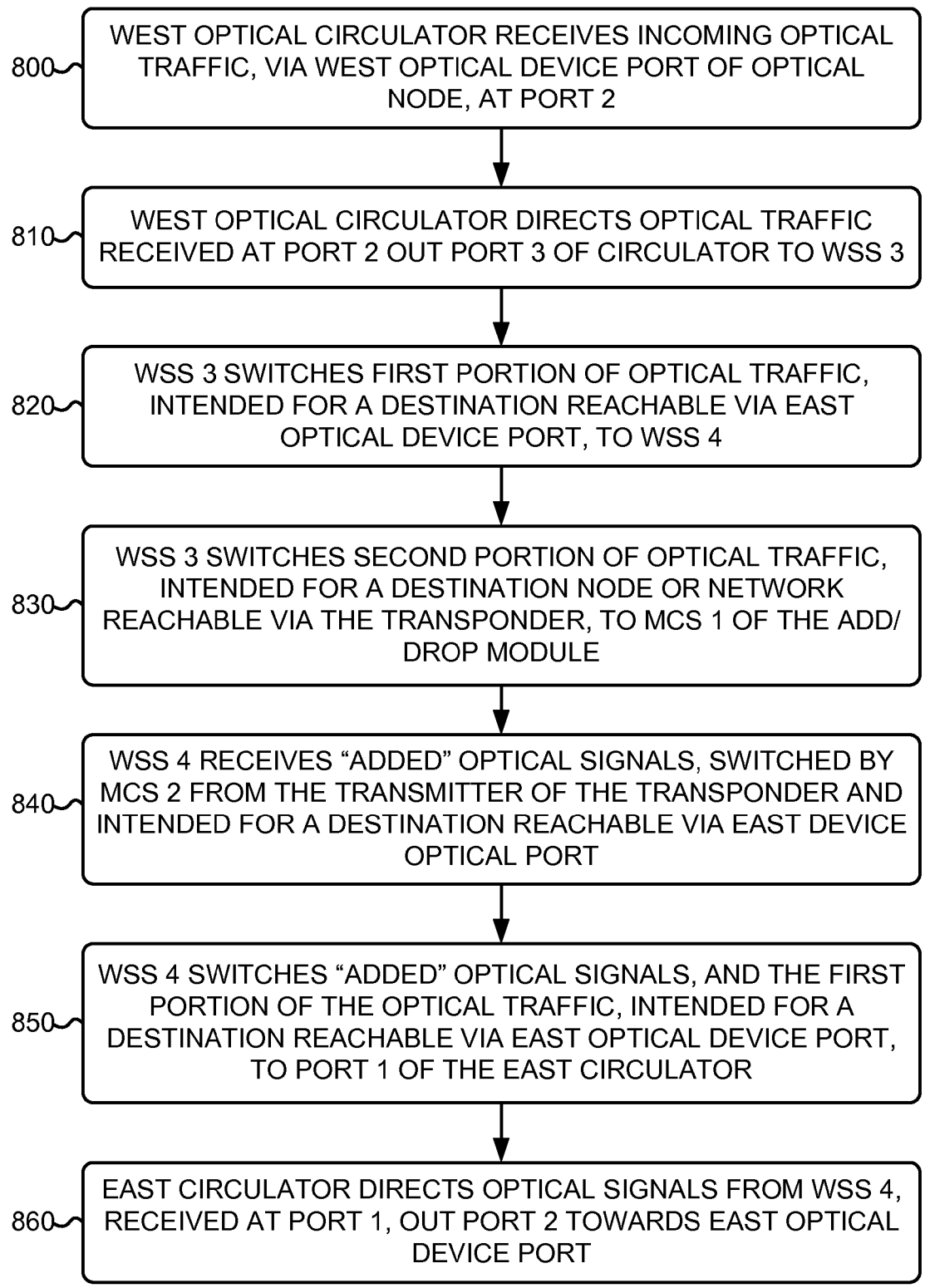
FIG. 8 is a flow diagram that illustrates an exemplary process for switching optical traffic, received at an optical node via a west optical device port, towards destinations reachable via an east optical device port or towards destinations reachable via a transponder of the optical node.

FIG. 8 is a flow diagram that illustrates an exemplary process for switching optical traffic, received at optical node 110 via west optical device port 220-1, towards destinations reachable via optical device port 220-2 or towards destinations reachable via transponder 230. The exemplary process of FIG. 8 may be implemented by ROADM core 300 of optical node 110.

The exemplary process may include west optical circulator 310-1 receiving incoming optical traffic, via west optical device port 220-1 of optical node 110, at port 2 of circulator 310-1 (block 800). Optical traffic that includes optical signals carried via multiple different optical channels (e.g., multiple optical wavelengths) may be received at optical device port 220-1 of optical node 110, and may transit to port 2 of west optical circulator 310-1 of ROADM core 300 (see FIG. 3). As described with respect to FIG. 4, the optical channels of the optical traffic traveling in a "west-to-east" direction may be different channels than the optical channels of optical traffic traveling in a "east-to-west" direction (described below with respect to FIG. 9). West optical circulator 310-1 directs the optical traffic received at port 2 for output at port 3 of the circulator to WSS 3 320-3 (block 810). The received optical traffic may be directed by west optical circulator 310-1 through port 2 and out port 3 of circulator 310-1 to an input of WSS 3 320-3.

WSS 3 320-3 switches a first portion of the optical traffic, intended for a destination reachable via east optical device port 220-2, to WSS 4 320-4 (block 820). Based on a destination of the optical signals of the optical traffic, WSS 3 320-3 may switch optical signals, of the "west-to-east" optical traffic, being sent to a destination reachable via optical device port 220-2 of optical node 110 to WSS 320-4 for further switching towards port 220-2. WSS 3 320-3 switches a second portion of the optical traffic, intended for a destination node or network reachable via transponder 230, to MCS 1 330-1 of add/drop module 305 (block 830). Transponder 230 may connect to another node(s) or network(s) that serves as a destination(s) for the second portion of the "west-to-east" optical traffic. Based on the destination of the optical signals of the optical traffic being the other node(s) or network(s) connected to transponder 230, WSS 3 320-3 may switch the optical signals to add/drop module 305 for switching by MCS 1 330-1 to receiver 340 of transponder 230.

WSS 4 320-4 receives "added" optical signals, switched by MCS 2 330-2 from the transmitter 350 of transponder 230 and intended for a destination reachable via east device optical port 220-2 (block 840). Another node(s) or network(s) connected to transponder 230 may transmit electrical signals (e.g., packet data) for delivery via optical network 100 using optical node 110 as an entry point to optical network 100. Upon conversion of the electrical signals to optical signals, transponder 230 transmits the optical signals to MCS 2 330-2, which switches the optical signals to WSS 4 320-4 for further switching towards optical device port 220-2. WSS 4 320-4 switches the "added" optical signals, and the first portion of the optical traffic, intended for a destination reachable via east optical device port 220-2, to port 1 of east circulator 310-2 (block 850). East circulator 310-2 directs optical signals from WSS 4 320-4, received at port 1, to port 2 for output towards towards east optical device port 220-2 (block 860). Optical signals, switched from WSS 3 320-3 and from MCS 2 330-2, are switched by WSS 4 320-4 to port 1 of east optical circulator 310-2 and directed out port 2 of circulator 310-2 for transmission via the optical fiber connected to optical device port 220-2. The exemplary process of FIG. 8 may be repeated for all optical traffic received at optical device port 220-1 of optical node 110.

Figure 9:
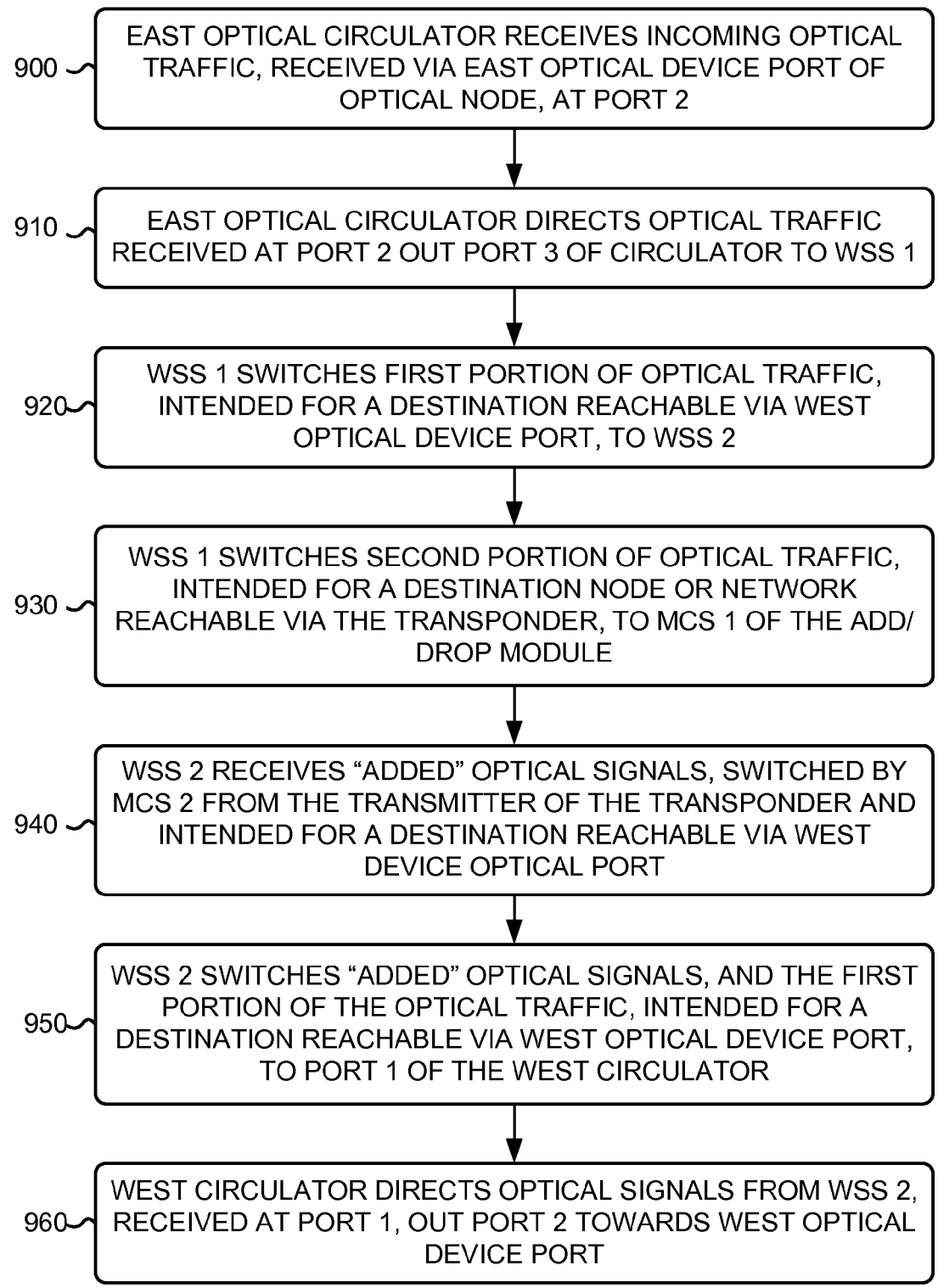
FIG. 9 is a flow diagram that illustrates an exemplary process for switching optical traffic, received at an optical node via an east optical device port, towards destinations reachable via a west optical device port or towards destinations reachable via a transponder of the optical node.

FIG. 9 is a flow diagram that illustrates an exemplary process for switching optical traffic, received at optical node 110 via east optical device port 220-2, towards destinations reachable via optical device port 220-1 or towards destinations reachable via transponder 230. The exemplary process of FIG. 9 may be implemented by ROADM core 300 of optical node 110.

The exemplary process may include east optical circulator 310-2 receiving incoming optical traffic, via east optical device port 220-2 of optical node 110, at port 2 of circulator 310-2 (block 900). Optical traffic that includes optical signals carried via multiple different optical channels (e.g., multiple optical wavelengths) may be received at optical device port 220-2 of optical node 110, and may transit to port 2 of east optical circulator 310-2 of ROADM core 300 (see FIG. 3). As described with respect to FIG. 4, the optical channels of the optical traffic traveling in an "east-to-west" direction may be different channels than the optical channels of optical traffic traveling in a "west-to-east" direction (described above with respect to FIG. 8).

East optical circulator 310-2 directs the optical traffic received at port 2 to port 3 of the circulator for output to WSS 1 320-1 (block 910). The received optical traffic may be directed by east optical circulator 310-2 through port 2 and out port 3 of circulator 310-2 to an input of WSS 1 320-1. WSS 1 320-1 switches a first portion of the optical traffic, intended for a destination reachable via east optical device port 220-1, to WSS 2 320-2 (block 920). Based on a destination of the optical signals of the optical traffic, WSS 1 320-1 may switch optical signals, of the "east-to-west" optical traffic, being sent to a destination reachable via optical device port 220-1 of optical node 110 to WSS 2 320-2 for further switching towards port 220-1.

WSS 1 320-1 switches a second portion of the optical traffic, intended for a destination node or network reachable via transponder 230, to MCS 1 330-1 of add/drop module 305 (block 930). Transponder 230 may connect to another node(s) or network(s) that serves as a destination(s) for the second portion of the "west-to-east" optical traffic. Based on the destination of the optical signals of the optical traffic being the other node(s) or network(s) connected to transponder 230, WSS 1 320-1 may switch the optical signals to add/drop module 305 for switching by MCS 1 330-1 to receiver 340 of transponder 230.

WSS 2 320-2 receives "added" optical signals, switched by MCS 2 330-2 from the transmitter 350 of transponder 230 and intended for a destination reachable via west device optical port 220-1 (block 940). Another node(s) or network(s) connected to transponder 230 may transmit electrical signals (e.g., packet data) for delivery via optical network 100 using optical node 110 as an entry point to optical network 100. Upon conversion of the electrical signals to optical signals, transponder 230 transmits the optical signals to MCS 2 330-2, which switches the optical signals to WSS 2 320-2 for further switching towards optical device port 220-1.

WSS 2 320-2 switches the "added" optical signals, and the first portion of the optical traffic, intended for a destination reachable via west optical device port 220-1, to port 1 of west optical circulator 310-1 (block 950). West circulator 310-1 directs optical signals from WSS 2 320-2, received at port 1, out port 2 towards west optical device port 220-1 (block 960). Optical signals, switched from WSS 1 320-1 and from MCS 2 330-2, are switched by WSS 2 320-2 to port 1 of west optical circulator 310-1 and directed out port 2 of circulator 310-1 for transmission via the optical fiber connected to optical device port 220-1. The exemplary process of FIG. 9 may be repeated for all optical traffic received at optical device port 220-2 of optical node 110.

Figure 10:
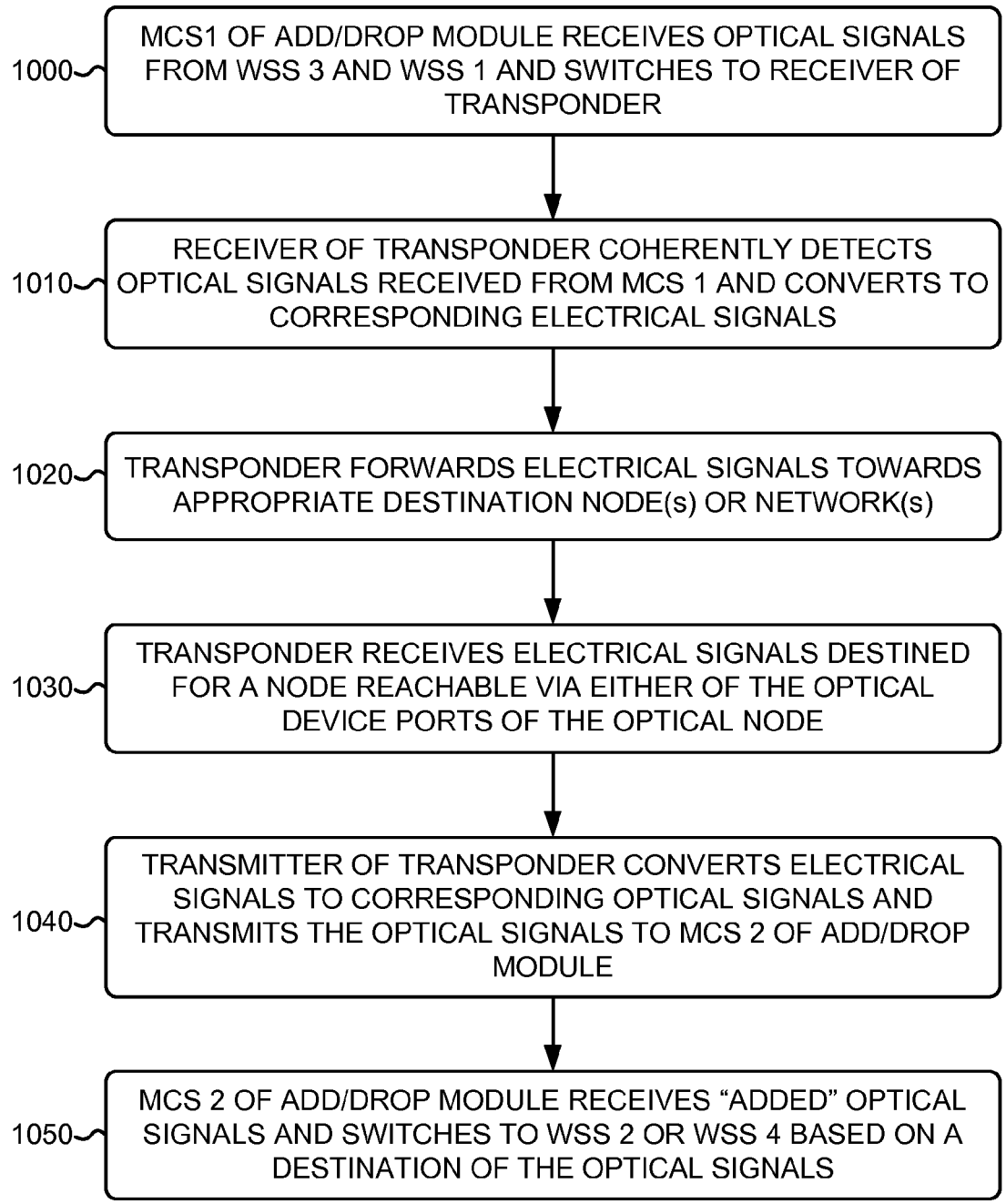
FIG. 10 is a flow diagram that illustrates an exemplary process for adding optical signals to bi-directional optical traffic transiting an optical node or dropping optical signals from the bi-directional optical traffic received at the optical device ports of the optical node.

FIG. 10 is a flow diagram that illustrates an exemplary process for adding optical signals to bi-directional optical traffic transiting optical node 110 or dropping optical signals from the bi-directional optical traffic received at optical device ports 220-1 and 220-2 of optical node 110. The exemplary process of FIG. 10 may be implemented by add/drop module 305 and transponder 230 of optical node 110.

The exemplary process may include MCS 1 330-1 of add/drop module 305 receiving optical signals from WSS 3 320-3 and WSS 1 320-1 and switching the optical signals to receiver 340 of transponder 230 (block 1000). As described with respect to block 830 of FIG. 8, and block 930 of FIG. 9, portions of the optical traffic received at either optical device port 220-1 or optical device port 220-2 may be destined for a node(s) or network(s) connected to transponder 230. WSS 3 320-3 and WSS 1 320-1 may switch the portions of the optical traffic to MCS 1 330-1 which, in turn, switches the optical signals to receiver 340 of transponder 230. Receiver 340 of transponder 230 coherently detects optical signals received from MCS 1 330-1 and converts the detected optical signals to corresponding electrical signals (block 1010). Receiver 340 of transponder 230 includes a coherent optical detector that detects the optical signals switched as an output from MCS 1 330-1 and converts those optical signals to electrical signals for delivery to the destination node(s) or network(s) connected to transponder 230. Transponder 230 forwards the electrical signals towards an appropriate destination node(s) or network(s) (block 1020). The electrical signals (e.g., packet data) may be forwarded, for example, to a destination node connected to a LAN or WAN that is connected to transponder 230.

Transponder 230 receives electrical signals destined for a node reachable via either of the optical device ports 220-1 or 220-2 of optical node 110 (block 1030). A node connected to, for example, a network (e.g., LAN or WAN) that is further connected to transponder 230 may send a series of packets, destined for another node reachable via optical device port 220-1, to transponder 230 of optical node 110. The series of packets may include encapsulated digital data (i.e., electrical signals). Transmitter 350 of transponder 230 may convert the electrical signals to corresponding optical signals and transmit the optical signals to MCS 2 330-2 of add/drop module 305 (block 1040). Transmitter 350 may include an optical transmitter that converts the digital data of the received electrical signals into optical signals (e.g., optical pulses on certain optical channels) for "adding" to optical traffic transiting optical node 110, and transmits the optical signals into an input of MCS 2 330-2. MCS 2 330-2 of add/drop module 305 receives the "added" optical signals and switches the optical signals to WSS 2 320-2 or WSS 4 320-4 based on a destination of the optical signals (block 1050). If the "added" optical signals have a destination reachable via optical device port 220-1, then MCS 2 330-2 switches the optical signals to WSS 2 320-2 for switching to west circulator 310-1. If the "added" optical signals have a destination reachable via optical device port 220-2, then MCS 2 330-2 switches the optical signals to WSS 4 320-4 for switching to east circulator 310-2.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 8-10, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An optical device, comprising:
a transponder;
a first optical device port configured to connect to a first optical fiber;
a second optical device port configured to connect to a second optical fiber that is different than the first optical fiber;
a first wavelength selective switch (WSS) and a second WSS configured to switch first optical traffic of bi-directional multi-wavelength optical traffic received at the first optical device port;
a third WSS and a fourth WSS configured to switch second optical traffic of the bi-directional multi-wavelength optical traffic received at the second optical device port;
a first optical circulator having a first circulator port coupled to the first optical device port, a second circulator port connected to an input of the first WSS, and a third circulator port connected to an output of the fourth WSS;
a second optical circulator having a first circulator port coupled to the second optical device port, a second circulator port connected to an output of the second WSS, and a third circulator port connected to an input of the third WSS; and
an add/drop module configured to receive third optical traffic received from the transponder and to send a portion of the first and second optical traffic to the transponder.

2. The optical device of claim 1, wherein the add/drop module includes a first multicast switch (MCS) having inputs connected to an output of the first WSS and to an output of the third WSS, and an output connected to the transponder.

3. The optical device of claim 2, wherein the add/drop module includes a second MCS having outputs connected to the second WSS and to the fourth WSS and an input connected to the transponder.

4. The optical device of claim 1, wherein the first optical circulator is coupled to the first optical device port via a first optical amplifier that is configured to amplify traffic of the bi-directional multi-wavelength traffic transiting the first optical amplifier.

5. The optical device of claim 4, wherein the first optical amplifier comprises a coupler connected to a Raman pump.

6. The optical device of claim 5, wherein the first optical amplifier further comprises one or more erbium doped fiber amplifiers connected in series with the coupler.

7. The optical device of claim 4, wherein the first optical amplifier further comprises one or more erbium doped fiber amplifiers connected in series with a coupler connected to a Raman pump.

8. The optical device of claim 4, wherein the second optical circulator is coupled to the second optical device port via a second optical amplifier that is configured to amplify traffic of the bi-directional multi-wavelength traffic transiting the second optical amplifier.

9. The optical device of claim 1, wherein the transponder comprises a coherent transponder configured to coherently detect the portion of the first and second optical traffic sent from the add/drop module.

10. The optical device of claim 1, wherein the first WSS, second WSS, third WSS, and fourth WSS each comprise a gridless WSS that enables flexible channel allocation.

11. An optical device, comprising:
a transponder;
a first device port connected to a first optical fiber and configured to carry bi-directional, multiple wavelength optical signals, including receiving first optical signals traveling in a first direction on the first optical fiber;
a second device port connected to a second optical fiber and configured to carry the bi-directional multiple wavelength optical signals, including receiving second optical signals traveling in a second direction on the second optical fiber; and
a reconfigurable optical add/drop multiplexer (ROAM) comprising:
an add/drop module configured to:
receive third optical signals, from the transponder, intended for a first destination reachable via the first device port and fourth optical signals intended for a second destination reachable via the second device port;
a ROADM core configured to:
switch a first portion of the first optical signals traveling in the first direction on the first optical fiber for transmission, and the fourth optical signals, out the second device port via the second optical fiber, and a second portion of the first optical signals to the add/drop module, and
switch a first portion of the second optical signals traveling in the second direction on the second optical fiber for transmission, and the third optical signals, out the first device port via the first optical fiber, and a second portion of the second optical signals to the add/drop module,
wherein the add/drop module is further configured to switch the second portion of the first optical signals and the second portion of the second optical signals to a receiver of the transponder, and
wherein the receiver of the transponder is further configured to:
detect the second portion of the first optical signals to generate corresponding first electrical signals and detect the second portion of the second optical signals to generate corresponding second electrical signals, and
transmit the first electrical signals and the second electrical signals towards one or more nodes or networks via the transponder.

12. The optical device of claim 11, wherein the receiver of the transponder comprises a coherent detection system that coherently detects the second portion of the first optical signals and the second portion of the second optical signals.

13. The optical device of claim 11, wherein the ROADM core comprises:
a first wavelength selective switch (WSS);
a second WSS;
a first circulator coupled to the first device port and having a first circulator port connected to the first WSS, wherein the first optical signals traveling in the first direction are received at a second circulator port of the first circulator and are directed to the first WSS via the first circulator port; and a second circulator having a first circulator port connected to the second WSS and a second circulator port coupled to the second device port,
wherein the first WSS is configured to:
switch the first portion of the first optical signals to a first input of the second WSS, and
switch the second portion of the first optical signals to the add/drop module;
wherein the second WSS is configured to:
receive the fourth optical signals from the transponder,
switch the first portion of the first optical signals and the fourth optical signals to the first circulator port of the second circulator,
wherein the second circulator directs the first portion of the first optical signals and the fourth optical signals out the second circulator port towards the second device port.

14. The optical device of claim 13, wherein the add/drop module comprises:
a first multicast switch (MCS) configured to switch the second portion of the first optical signals to the receiver of the transponder; and
a second MCS configured to switch the fourth optical signals from the transponder to an input of the second WSS.

15. The optical device of claim 13, wherein the ROADM core comprises:
a third wavelength selective switch (WSS); and
a fourth WSS;
wherein the second circulator includes a third circulator port connected to the third WSS and wherein the second optical signals traveling in the second direction are received at the second circulator port of the second circulator and are directed to the third WSS via the first circulator port of the second circulator,
wherein the first circulator includes a third circulator port connected to an output of the fourth WSS,
wherein the third WSS is configured to:
switch the first portion of the second optical signals to a first input of the fourth WSS, and
switch the second portion of the second optical signals to the add/drop module;
wherein the fourth WSS is configured to:
receive the third optical signals from the transponder,
switch the first portion of the second optical signals and the third optical signals to the third circulator port of the first circulator, and
wherein the first circulator directs the first portion of the second optical signals and the third optical signals out the second circulator port of the first circulator towards the first device port.

16. The optical device of claim 15, wherein the add/drop module comprises:
a first multicast switch (MCS) configured to switch the second portion of the first optical signals and the second portion of the second optical signals to the receiver of the transponder; and
a second MCS configured to switch the third optical signals from the transponder to an input of the fourth WSS and to switch the fourth optical signals from the transponder to an input of the second WSS.

17. An optical device, comprising:
a first optical port configured to connect to a first optical fiber;
a second optical port configured to connect to a second optical fiber;
optical components configured to switch bi-directional optical traffic through the optical device via the first optical port and the second optical port, wherein the optical components include:
first optical components configured to switch first optical traffic carried via a first set of optical channels from the first optical port to the second optical port, and
second optical components configured to switch second optical traffic carried via a second set of optical channels from the second optical port to the first optical port, wherein the second set of optical channels comprises different optical channels than the first set of optical channels; and
a transponder that includes a coherent receiver, configured to:
coherently detect a portion of the first optical traffic and a portion of the second optical traffic, and
convert the detected portions of the first and second optical traffic to electrical signals for delivery to a node or network external to the optical device.

18. The optical device of claim 17, wherein first set of optical channels comprise optical channels having a first series of spaced wavelengths and the second set of optical channels comprise optical channels having a second series of spaced wavelengths that have an offset in wavelength from the first series of spaced wavelengths.

19. The optical device of claim 17, wherein the optical components include a first optical circulator coupled to the first optical port and a second optical circulator coupled to the second optical port, wherein the first optical circulator connects to first switching components for switching the first optical traffic from the first optical port to the second optical port, and wherein the second optical circulator connects to second switching components for switching the second optical traffic from the second optical port to the first optical port.

20. The optical device of claim 19, wherein the first switching components comprise first Wavelength Selective Switches (WSSs) and wherein the second switching components comprise second WSSs.

* * * * *